(12) United States Patent
Varnavas et al.

(10) Patent No.: US 11,394,631 B2
(45) Date of Patent: Jul. 19, 2022

(54) DETERMINING CHANGES IN A PERFORMANCE OF A SERVER

(71) Applicant: Citrix Systems, Inc., Fort Lauderdale, FL (US)

(72) Inventors: Andreas Varnavas, Patras (GR); Satyendra Tiwari, San Jose, CA (US); Manikam Muthiah, Banglore (IN); Nikolaos Georgakopoulos, Patras (GR)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 17/002,353

(22) Filed: Aug. 25, 2020

(65) Prior Publication Data
US 2022/0029899 A1    Jan. 27, 2022

Related U.S. Application Data

(63) Continuation of application No. PCT/GR2020/000038, filed on Jul. 22, 2020.

(51) Int. Cl.
*H04L 43/065* (2022.01)
(52) U.S. Cl.
CPC .................. *H04L 43/065* (2013.01)
(58) Field of Classification Search
None
See application file for complete search history.

(56) References Cited

U.S. PATENT DOCUMENTS

| | | | | |
|---|---|---|---|---|
| 8,745,195 B1* | 6/2014 | Presotto | ................... | H04L 41/06 709/223 |
| 10,270,668 B1* | 4/2019 | Thompson | ........... | H04L 41/5009 |
| 11,080,093 B2* | 8/2021 | Chandran | .............. | G06F 9/5022 |
| 2006/0224775 A1* | 10/2006 | Lee | ...................... | H04L 67/1008 709/248 |
| 2008/0183865 A1* | 7/2008 | Appleby | ............. | H04L 67/1002 709/224 |
| 2009/0265458 A1* | 10/2009 | Baker | ...................... | H04L 47/18 709/224 |
| 2014/0237067 A1* | 8/2014 | Todd | ................... | H04L 67/1031 709/213 |
| 2014/0372807 A1* | 12/2014 | Poola | .................. | G06F 11/3414 714/39 |
| 2015/0378806 A1* | 12/2015 | Natsumeda | ......... | G06F 11/3447 714/37 |

(Continued)

OTHER PUBLICATIONS

International Search Report and Written Opinion on PCT Appl. No. PCT/GR2020/000038 dated Mar. 19, 2021.

*Primary Examiner* — Joshua Joo
(74) *Attorney, Agent, or Firm* — Foley & Lardner LLP

(57) ABSTRACT

Described embodiments provide systems and methods for determining a change in a performance of a server. A device can receive a processing load and a request rate of a server. The device can determine a value indicative of a correlation between the processing load and the request rate of the server for a range of time. The device can determine whether the value is outside a range of a threshold for the server. The threshold can be indicative of one or more previous values determined for the server for the range of time. The device can generate an alert indicating a change in a performance of the server responsive to a comparison of the value to the threshold for the server.

14 Claims, 5 Drawing Sheets

(56) References Cited

U.S. PATENT DOCUMENTS

| | | | |
|---|---|---|---|
| 2015/0381648 A1* | 12/2015 | Mathis | H04L 63/1425 |
| | | | 726/22 |
| 2016/0065438 A1* | 3/2016 | Bird | H04L 43/0876 |
| | | | 709/223 |
| 2016/0210556 A1* | 7/2016 | Ben Simhon | G06N 3/08 |
| 2017/0134289 A1* | 5/2017 | Xiao | H04L 43/16 |
| 2017/0272343 A1 | 9/2017 | Giles | |
| 2017/0367081 A1* | 12/2017 | Cui | H04W 28/0231 |
| 2019/0114244 A1* | 4/2019 | Salunke | G06F 11/079 |
| 2019/0386879 A1* | 12/2019 | Chen | H04L 43/0876 |
| 2020/0119978 A1* | 4/2020 | Gudipati | H04L 41/0686 |
| 2020/0213207 A1* | 7/2020 | Nazar | H04L 41/142 |
| 2020/0374199 A1* | 11/2020 | Arrabolu | H04L 67/16 |

* cited by examiner

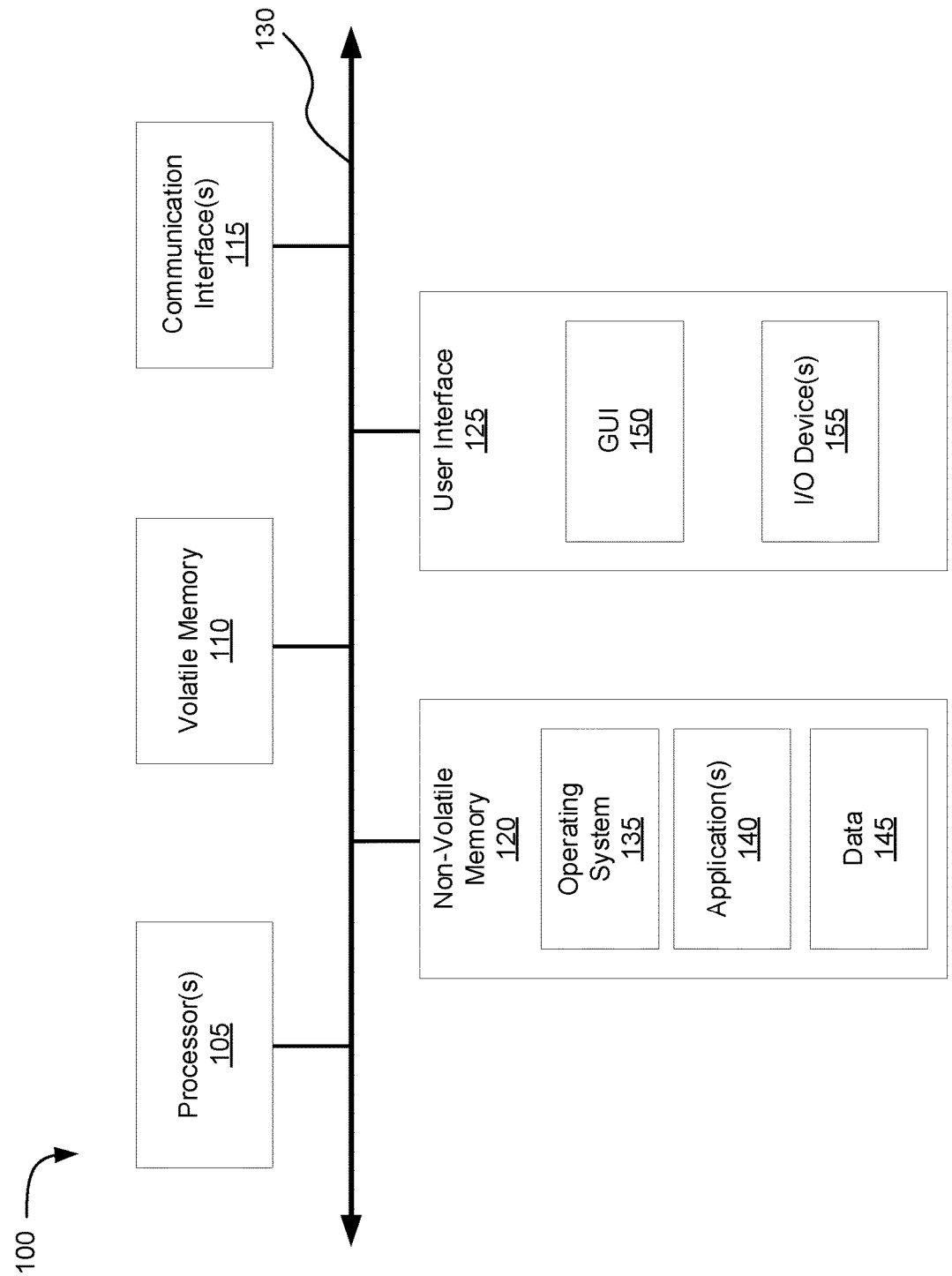

DETERMINING CHANGES IN A PERFORMANCE OF A SERVER

CROSS-REFERENCE TO RELATED APPLICATIONS

This application is a continuation of, and claims priority to and the benefit of International Patent Application No. PCT/GR2020/00038, titled "DETERMINING CHANGES IN A PERFORMANCE OF A SERVER", and filed on Jul. 22, 2020, the entire contents of which are hereby incorporated herein by references in its entirety for all purposes.

BACKGROUND

In network environments, a server can host or provide access to a plurality of resources or applications for a plurality of users. For example, a user can establish a session to particular application or resource through the server. The resources or applications can include third party resources or applications provided by one or more third party servers. The server can establish one or more connections to the third party servers to provide the access the plurality of resources and applications for the plurality of users.

SUMMARY

Systems and methods for determining changes in a performance of a server are provided herein. A device can determine and use a correlation between a processing load (e.g., central processing unit (CPU) utilization) and a request rate for the server to determine changes in a performance of the server and/or a change in way the server is utilizing its respective resources (e.g., CPU resources). The device can detect and monitor a processing load of a server and a level of incoming traffic (e.g., request rate). A correlation value between the processing load and the request rate can be determined and monitored, for example, in a rolling window or ongoing manner. The device can detect or monitor changes in the correlation value using a threshold value to determine if the correlation changes from one or more previous correlation values for the server. In embodiments, the device can generate an alert indicating a change in the performance of the server responsive to a comparison of the correlation value to the threshold value for the server. In embodiments, the device can use the correlation value to monitor the CPU utilization of the server over different ranges of time to identify performance issues with a server or forecast potential performance issues for the server. The correlation value can be used to avoid or reduce overload conditions, performance issues and/or imbalanced load distributions in a network (e.g., work network, cloud computing environment) and provide increased resource utilization and better user experience.

In at least one aspect, a method is provided. The method can include receiving, by a device, a processing load and a request rate of a server. The method can include determining, by the device, a value indicative of a correlation between the processing load and the request rate of the server for a range of time. The method can include determining, by the device, whether the value is outside a range of a threshold for the server. The threshold can be indicative of one or more previous values determined for the server for the range of time. The method can include generating, by the device, an alert indicating a change in a performance of the server responsive to a comparison of the value to the threshold for the server.

In embodiments, the method can include detecting, by the device, a change in the value for the server responsive to the value being outside the range of the threshold for the server. The method can include identifying, by the device, a degradation in a performance of the server responsive to the change in the value for the server. The method can include generating, by the device, the alert indicating a degradation in a performance of the server responsive to the value being outside the range of the threshold for the server. The method can include applying, by the device, a filter to the processing load and to the request rate to generate a first signal indicative of a plurality of conditioned values for the processing load for the range of time and second signal indicative of a plurality of conditioned values for the request rate for the range of time. The method can include determining, by the device, the value between the first signal and the second signal.

The method can include assigning, by the device, a confidence for value of the server. The method can include detecting, by the device that the confidence is outside a confidence range, the confidence range including a plurality of confidences for one or more previous values determined for the server. The method can include determining, by the device, a change in the value for the server responsive to the confidence being outside the confidence range. The method can include detecting, by the device, a degradation in a performance of the server responsive to the change in the value for the server.

In embodiments, the method can include continuously determining, by the device, the processing load over one or more ranges of time, the processing load indicative of a central processing unit (CPU) utilization of the server. The method can include, where the request rate is indicative of a total number of requests to the server, continuously determining, by the device, the total number of requests to the server for a plurality of ranges of time. The method can include, where the request rate is indicative of a number of requests to a service of the server, continuously determining, by the device, the number of requests for the service for a plurality of ranges of time.

In at least one aspect, a system is provided. The system can include one or more processors coupled to memory. The one or more processors can be configured to receive a processing load and a request rate of a server. The one or more processors can be configured to determine a value indicative of a correlation between the processing load and the request rate of the server for a range of time. The one or more processors can be configured to determine whether the value is outside a range of a threshold for the server. The threshold can be indicative of one or more previous values determined for the server for the range of time. The one or more processors can be configured to generate an alert indicating a change in a performance of the server responsive to a comparison of the value to the threshold for the server.

In embodiments, the one or more processors can be configured to detect a change in the value for the server responsive to the value being outside the range of the threshold for the server. The one or more processors can be configured to identify a degradation in a performance of the server responsive to the change in the value for the server. The one or more processors can be configured to generate the alert indicating a degradation in a performance of the server responsive to the value being outside the range of the threshold for the server. The one or more processors can be configured to apply a filter to the processing load and to the request rate to generate a first signal indicative of a plurality of conditioned values for the processing load for the range of time and second signal indicative of a plurality of conditioned values for the request rate for the range of time. The one or more processors can be configured to determine the value between the first signal and the second signal.

The one or more processors can be configured to assign a confidence for the value of the server. The one or more processors can be configured to detect that the confidence is outside a confidence range, the confidence range including a plurality of confidences for one or more previous values determined for the server. The one or more processors can be configured to determine a change in the value for the server responsive to the confidence being outside the confidence range. The one or more processors can be configured to detect a degradation in a performance of the server responsive to the change in the value for the server.

The one or more processors can be configured to continuously determine the processing load over one or more ranges of time, the processing load indicative of a central processing unit (CPU) utilization of the server. The one or more processors can be configured to continuously determine a total number of requests to the server for a plurality of ranges of time. The one or more processors can be configured to continuously determine a number of requests for a service of the server for a plurality of ranges of time.

In at least one aspect, a non-transitory computer-readable medium is provided. The non-transitory computer-readable medium can include instructions that, when executed by the processor of a device, cause the processor to receive a processing load and a request rate of a server. The non-transitory computer-readable medium can include instructions that, when executed by the processor of a device, cause the processor to determine a value indicative of a correlation between the processing load and the request rate of the server for a range of time. The non-transitory computer-readable medium can include instructions that, when executed by the processor of a device, cause the processor to determine whether the value is outside a range of a threshold for the server, the threshold indicative of one or more previous values determined for the server for the range of time. The non-transitory computer-readable medium can include instructions that, when executed by the processor of a device, cause the processor to generate an alert indicating a change in a performance of the server responsive to a comparison of the value to the threshold for the server.

The non-transitory computer-readable medium can include instructions that, when executed by the processor of a device, cause the processor to detect a change in the value for the server responsive to the value being outside the range of the threshold for the server. The non-transitory computer-readable medium can include instructions that, when executed by the processor of a device, cause the processor to identify a degradation in a performance of the server responsive to the change in the value for the server.

The details of various embodiments of the disclosure are set forth in the accompanying drawings and the description below.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

FIG. 1A is a block diagram of embodiments of a computing device;

DETAILED DESCRIPTION

Figure 1B:
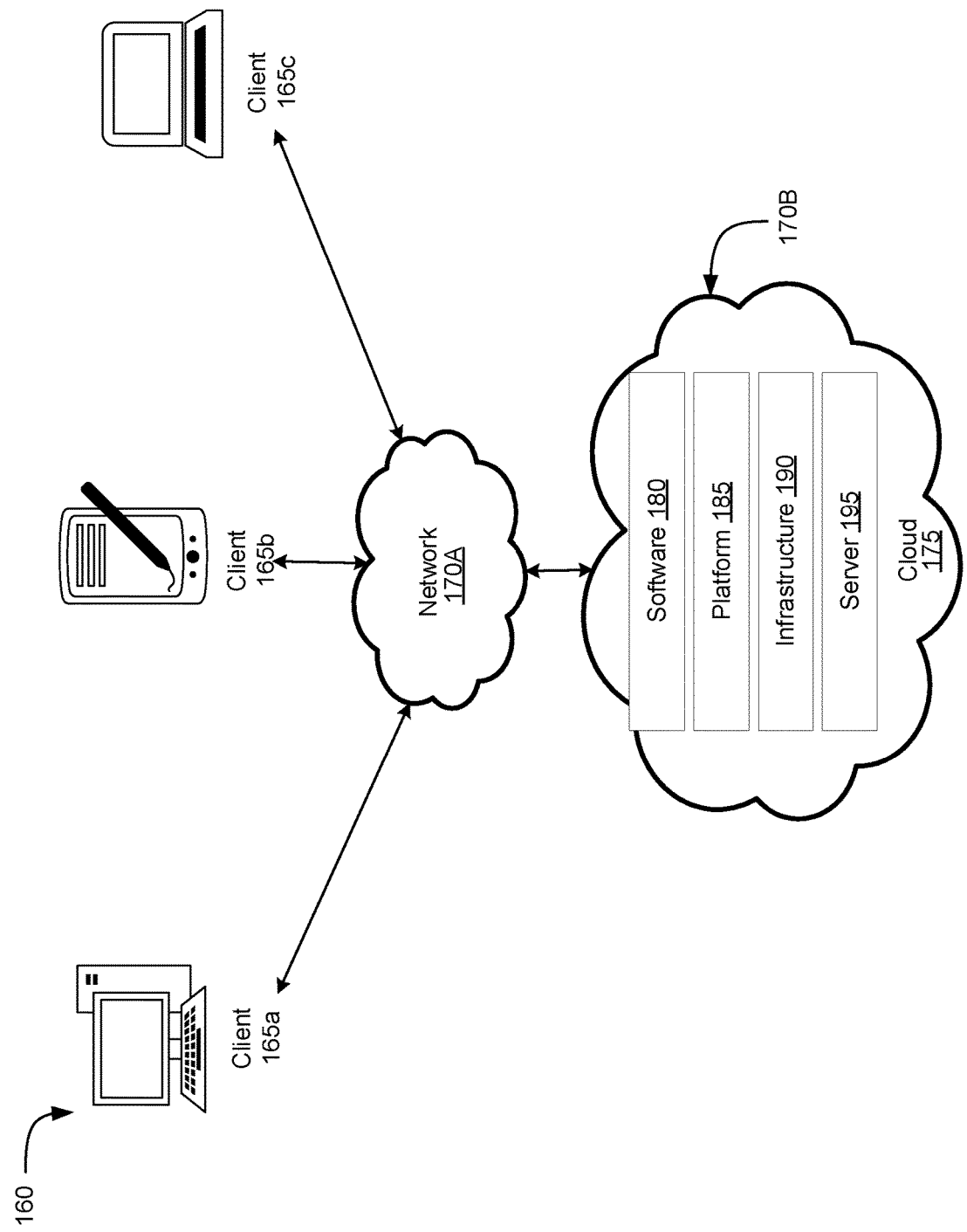
FIG. 1B is a block diagram depicting a computing environment comprising client device in communication with cloud service providers.

Systems and methods for determining a change in a performance of a server are provided herein. A device can determine and use a correlation value between a processing load (e.g., CPU utilization) of a server and a request rate (e.g., level of incoming traffic) for the server to detect changes in a performance of the server. The device can determine and monitor the correlation value in a rolling window to detect changes in a performance of a server. For example, the device can continually compare a recent or current correlation value for a server to a threshold of the server to determine if the correlation value has changed beyond a threshold range or allowable amount from one or more previous correlation values of the server. In embodiments, the change in the correlation value can indicate a change in a performance of the server. The device can generate an alert in response to a change in the performance of the server and/or reallocate resources in a computing environment in response to a change in the performance of the server.

For example, a server can include a plurality of services executing on the server. The services can utilize server resources, including but not limited to, CPU resources and memory. The incoming traffic or request rate for the services can fluctuate during the course of a monitoring period (e.g., a day, a week, a month) causing spikes or increases in the usage of server resources. In embodiments, new services can be activated requesting or using additional server resources. The new service can request or cause the allocation of memory resources and/or can begin consuming server resources at various points in a monitoring period. The increase in the utilization of the server resources can impact a performance of the server. For example, a spike or increase in server resources can cause a degradation in the performance of the server, including but not limited to, reduced response times, failures or decreased user experience for users accessing the services of the server. Further, the change in resource utilization can happen in a non-intended way (e.g., a background process misconfigured to scan the system) and can go undetected by the server.

The systems and methods provided herein can use a correlation value between a processing load and a request rate of a server to monitor the resource utilization of the server and detect a change in the performance of the server. A device can identify changes in the performance of a server by detecting changes in the correlation between the processing load (e.g., CPU utilization) of the server and the request rate (e.g., level of incoming traffic) for the server. The request rate can include a total request rate of the server or a request rate of each service executing on the server individually. The device can determine the processing load and request rate for a server. The signals representing the processing load and request rate can be conditioned or smoothed to remove high frequency random fluctuations prior to determining the correlation. In embodiments, the device can apply a filter (e.g., moving average filter) to condition the processing load signal and the request rate signal. The device can perform sampling (e.g., subsampling) on the output of the filter to reduce or avoid introducing autocorrelation into the two signals.

The device can determine the correlation between the processing load and request rate for a range of time, rolling window or ongoing manner. For example, the monitoring period (e.g., one day, one week) can be selected to such that enough variability between the processing load and request rate can be observed. In embodiments, when the characteristics of the services executing on a server remain unchanged, a small or minimal fluctuation in the correlation can be expected during a monitoring period. However, a large change in the correlation can indicate a change in the performance of the respective server. The device can determine or select a threshold value for the server to detect a large or significant change in the correlation. The device can determine or select the threshold value for the server using one or more previous correlation values of the server. For example, the device can use a previous monitoring period and/or use one or more previous correlation values during a current monitoring period to generate the threshold value for the server and to detect outlier correlation values. In embodiments, the threshold value can be generated based in part on an interquartile range of the previously observed correlations values. If a new or subsequent correlation value is outside of (e.g., greater than, less than) or beyond the threshold value, the device can determine a change in correlation occurred. The device can assign or calculate a confidence interval for each correlation value. For example, if a confidence interval of a current correlation value does not intersect with a confidence interval of one or more previous correlation values, the device can determine a change in correlation occurred.

The device can use the correlation and the threshold to monitor and detect changes in the performance of a server. The device can, in response to a detection of a change in the performance of a server, generate an alert indicating the change in performance of the server. The alert can indicate a reason for the change and/or provide a recommendation or corrective action to address the change in the performance of the server. In embodiments, the device can use the correlation value to predict and forecast potential changes in a performance of a server and to provide informed decision making for resource utilization within a computing environment. In embodiments, the correlation value can be used to provide increased to avoid or reduce overload conditions, performance issues and/or imbalanced load distributions in a network (e.g., work network, cloud computing environment) and provide increased resource utilization and better user experience.

Section A describes a computing environment which may be useful for practicing embodiments described herein; and Section B describes methods and systems for determining a change in a performance of a server.

A. Computing Environment

Prior to discussing the specifics of embodiments of the systems and methods of for securing offline data (e.g., browser offline data) for shared accounts, it may be helpful to discuss the computing environments in which such embodiments may be deployed.

As shown in FIG. 1A, computer 100 may include one or more processors 105, volatile memory 110 (e.g., random access memory (RAM)), non-volatile memory 120 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 125, one or more communications interfaces 115, and communication bus 130. User interface 125 may include graphical user interface (GUI) 150 (e.g., a touchscreen, a display, etc.) and one or more input/output (I/O) devices 155 (e.g., a mouse, a keyboard, a microphone, one or more speakers, one or more cameras, one or more biometric scanners, one or more environmental sensors, one or more accelerometers, etc.). Non-volatile memory 120 stores operating system 135, one or more applications 140, and data 145 such that, for example, computer instructions of operating system 135 and/or applications 140 are executed by processor(s) 105 out of volatile memory 110. In some embodiments, volatile memory 110 may include one or more types of RAM and/or a cache memory that may offer a faster response time than a main memory. Data may be entered using an input device of GUI 150 or received from I/O device(s) 155. Various elements of computer 100 may communicate via one or more communication buses, shown as communication bus 130.

Computer 100 as shown in FIG. 1A is shown merely as an example, as clients, servers, intermediary and other networking devices and may be implemented by any computing or processing environment and with any type of machine or set of machines that may have suitable hardware and/or software capable of operating as described herein. Processor(s) 105 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A "processor" may perform the function, operation, or sequence of operations using digital values and/or using analog signals. In some embodiments, the "processor" can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors. A processor including multiple processor cores and/or multiple processors multiple processors may provide functionality for parallel, simultaneous execution of instructions or for parallel, simultaneous execution of one instruction on more than one piece of data.

Communications interfaces 115 may include one or more interfaces to enable computer 100 to access a computer network such as a Local Area Network (LAN), a Wide Area Network (WAN), a Personal Area Network (PAN), or the Internet through a variety of wired and/or wireless or cellular connections.

In described embodiments, the computing device 100 may execute an application on behalf of a user of a client computing device. For example, the computing device 100 may execute a virtual machine, which provides an execution session within which applications execute on behalf of a user or a client computing device, such as a hosted desktop session. The computing device 100 may also execute a terminal services session to provide a hosted desktop environment. The computing device 100 may provide access to a computing environment including one or more of: one or more applications, one or more desktop applications, and one or more desktop sessions in which one or more applications may execute.

Referring to FIG. 1B, a computing environment 160 is depicted. Computing environment 160 may generally be considered implemented as a cloud computing environment, an on-premises ("on-prem") computing environment, or a hybrid computing environment including one or more on-prem computing environments and one or more cloud computing environments. When implemented as a cloud computing environment, also referred as a cloud environment, cloud computing or cloud network, computing environment 160 can provide the delivery of shared services (e.g., computer services) and shared resources (e.g., computer resources) to multiple users. For example, the computing environment 160 can include an environment or system for providing or delivering access to a plurality of shared services and resources to a plurality of users through the interne. The shared resources and services can include, but not limited to, networks, network bandwidth, servers 195, processing, memory, storage, applications, virtual machines, databases, software, hardware, analytics, and intelligence.

In embodiments, the computing environment 160 may provide client 165 with one or more resources provided by a network environment. The computing environment 160 may include one or more clients 165a-165n, in communication with a cloud 175 over one or more networks 170A, 170B. Clients 165 may include, e.g., thick clients, thin clients, and zero clients. The cloud 175 may include back end platforms, e.g., servers 195, storage, server farms or data centers. The clients 165 can be the same as or substantially similar to computer 100 of FIG. 1A.

The users or clients 165 can correspond to a single organization or multiple organizations. For example, the computing environment 160 can include a private cloud serving a single organization (e.g., enterprise cloud). The computing environment 160 can include a community cloud or public cloud serving multiple organizations. In embodiments, the computing environment 160 can include a hybrid cloud that is a combination of a public cloud and a private cloud. For example, the cloud 175 may be public, private, or hybrid. Public clouds 175 may include public servers 195 that are maintained by third parties to the clients 165 or the owners of the clients 165. The servers 195 may be located off-site in remote geographical locations as disclosed above or otherwise. Public clouds 175 may be connected to the servers 195 over a public network 170. Private clouds 175 may include private servers 195 that are physically maintained by clients 165 or owners of clients 165. Private clouds 175 may be connected to the servers 195 over a private network 170. Hybrid clouds 175 may include both the private and public networks 170A, 170B and servers 195.

The cloud 175 may include back end platforms, e.g., servers 195, storage, server farms or data centers. For example, the cloud 175 can include or correspond to a server 195 or system remote from one or more clients 165 to provide third party control over a pool of shared services and resources. The computing environment 160 can provide resource pooling to serve multiple users via clients 165 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In embodiments, the computing environment 160 can provide on-demand self-service to unilaterally provision computing capabilities (e.g., server time, network storage) across a network for multiple clients 165. The computing environment 160 can provide an elasticity to dynamically scale out or scale in responsive to different demands from one or more clients 165. In some embodiments, the computing environment 160 can include or provide monitoring services to monitor, control and/or generate reports corresponding to the provided shared services and resources.

In some embodiments, the computing environment 160 can include and provide different types of cloud computing services. For example, the computing environment 160 can include Infrastructure as a service (IaaS). The computing environment 160 can include Platform as a service (PaaS). The computing environment 160 can include server-less computing. The computing environment 160 can include Software as a service (SaaS). For example, the cloud 175 may also include a cloud based delivery, e.g. Software as a Service (SaaS) 180, Platform as a Service (PaaS) 185, and Infrastructure as a Service (IaaS) 190. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Clients 165 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 165 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 165 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, Calif.). Clients 165 may also access SaaS resources through smartphone or tablet applications, including, e.g., Salesforce Sales Cloud, or Google Drive app. Clients 165 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

B. Determining a Change in a Performance of a Server

Systems and methods for determining a change in a performance of a server using a correlation value are provided herein. A device can receive or determine a processing load (e.g., CPU utilization) and a request rate for a server. The device can determine a correlation value between the processing load and the request rate to detect a change in a performance of the server. For example, the device can determine and monitor the correlation value in a rolling window and compare the correlation value to a threshold (e.g., outlier threshold) to determine if the correlation value has changed beyond a threshold range or allowable amount from one or more previous correlation values of the server. The device can generate an alert in response to a change in the performance of the server and/or reallocate resources in a computing environment in response to a change in the performance of the server. In embodiments, the device can use the correlation value to continually monitor a performance of the server, identify a change in a performance of the server and/or generate alerts or instructions directed to decision making to reduce or avoid performance issues for one or more servers within a computing environment.

Figure 2A:
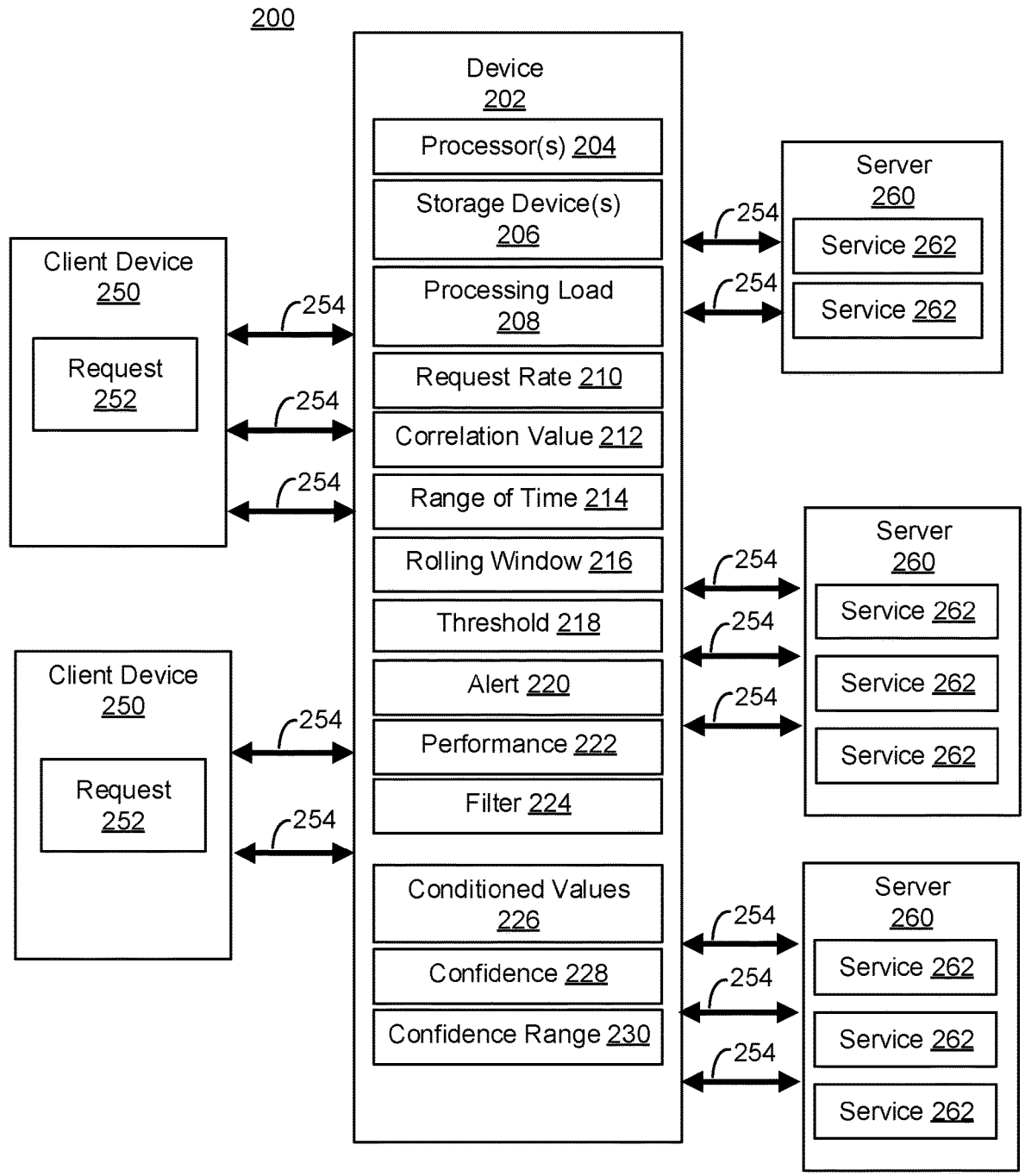
FIG. 2A is a block diagram of a system for determining a change in a performance of a server.

Referring to FIG. 2A, depicted is a block diagram of one embodiment of a computing environment 200 having a device 202 to determine a change in a performance 222 of a server 260. The device 202 can determine correlation values 212 (e.g., values 212) between a processing load 208 and a request rate 210 for a server 260 to monitor a performance of the server 260 and reallocate resources, for example, if the correlation value 212 exceeds a threshold 218 or is outside a threshold 218 (e.g., threshold range). The computing environment 200 (e.g., server farm, private network, public cloud) can include the plurality of servers 260 to establish sessions 254 to client devices 250 and provide access to services 262, resources and/or applications of the respective servers 260. For example, the device 202 can receive a request from a client device 250 to access at least one service 262 of a server 260. The device 202 can monitor one or more servers 260 and services 262 executing on the servers 260 using a correlation value 212 determined for each server 260. The device 202 can assess and/or reallocate resources for the servers 260 responsive to a comparison of the correlation value 212 to a threshold 218 for a respective server 260. In embodiments, the device 202 can use the correlation values 212 to balance load across the plurality of servers 260, increase or maximize resource utilization across the computing environment 200 and increase a user experience of users of the respective client devices 250. In embodiments, the computing environment 200 can be the same as or substantially similar to the computing environment 160 of FIG. B.

The device 202 can be implemented using hardware or a combination of software and hardware. For example, components of the device 202 can include logical circuity (e.g., a central processing unit or CPU) that responses to and processes instructions fetched from a memory unit (e.g., storage device 206). Components of the device 202 can include or use a microprocessor or a multi-core processor. A multi-core processor can include two or more processing units (e.g., processor 204) on a single computing component. Components of the device 202 can be based on any of these processors, or any other processor capable of operating as described herein. Processors can utilize instruction level parallelism, thread level parallelism, different levels of cache, etc. For example, the device 202 can include at least one logic device such as a computing device or server having at least one processor 204 to communicate with one or more client devices 250. The components and elements of the device 202 can be separate components or a single component. The device 202 can include a memory component (e.g., storage device 206) to store and retrieve data (e.g., correlation values 212, thresholds 218, confidence values 228, confidence ranges 230). The memory can include a random access memory (RAM) or other dynamic storage device, coupled with the storage device 206 for storing information, and instructions to be executed by the device 202. The memory can include at least one read only memory (ROM) or other static storage device coupled with the storage device 206 for storing static information and instructions for the device 202. The memory can include a storage device 206, such as a solid state device, magnetic disk or optical disk, to persistently store information and instructions. The device 202 can be the same as or substantially similar to computer 100 of FIG. 1A.

The device 202 can include a processor 204. The processor 204 can include non-volatile memory that stores computer instructions and an operating system. For example, the computer instructions can be executed by the processor 204 out of volatile memory to perform all or part of the method 300. In some embodiments, the device 202 can include a non-transitory computer-readable medium, comprising instructions that, when executed by the processor 204 of the device 202, cause the processor 204 to perform all or part of the method 300. The processor 204 can include a database and be configured to generate and/or store values including, but not limited to, correlation values 212, thresholds 218, confidence values 228, and confidence ranges 230. The processor 204 can include non-volatile memory that stores computer instructions and an operating system. For example, the computer instructions can be executed by the processor 204 out of volatile memory to perform all or part of the method 300. The device 202 can include a non-transitory computer-readable medium that includes instructions that, when executed by the processor 204 of the device 202 cause the processor 204 to execute or perform the functionalities of the method 300.

The device 202 can determine or receive a processing load 208 for a server 260. In embodiments, the device 202 can determine or receive a processing load 208 (e.g., processing load signal) for a plurality of servers 260 of the computing environment 200. The processing load 208 can include, but not limited to, a CPU utilization value, a resource utilization value, a service 262 load value, a device usage value, or a load on one or more processors of a server 260. The processing load 208 can include or correspond to load from one or more services 262 running on or executing on a server 260, one or more applications provided by or hosted by a server 260. In embodiments, the processing load 208 can include a processing load signal 208 (e.g., time series signal) and the device 202 can continually determine or receive the processing load signal 208 for a server 260 for a range of time 214 or rolling window 216 (e.g., monitoring period).

The device 202 can determine or receive a request rate 210 for a server 260. In embodiments, the device 202 can determine or receive a request rate 210 (e.g., request rate signal) for a plurality of servers 260 of the computing environment 200. The request rate 210 can include or correspond to a level of incoming traffic and/or a number of requests to one or more services 262 of a server 260. For example, the requests can include requests from one or more client devices 250 to access a service 262 of a server 260. The request rate 210 can include or correspond to a total request rate for a server 260. The request rate 210 can include or correspond to a request rate 210 of an individual service 262. The request rate 210 can include a total number of requests to a particular service 262 or the request rate of each service 262 running on the server 260 individually. In embodiments, the request rate 210 can include a request rate signal 210 (e.g., time series signal) and the device 202 can continually determine or receive the request rate 210 for a server 260 for a range of time 214 or rolling window 216 (e.g., monitoring period).

The device 202 can determine a correlation value 212 for a server 260. In embodiments, the device 202 can determine a correlation value 212 for each server 260 of a plurality of servers 260 of the computing environment 200. The correlation value 212 (e.g., correlation coefficient) can include or represent a numerical measure of a statistical relationship (e.g., correlation) between two variables, here between the processing load 208 and the request rate 210. The correlation value 212 (e.g., correlation coefficient) can include or represent a metric indicating a strength and direction of a linear relationship between the processing load 208 and the request rate 210. In some embodiments, the device 202 can determine a variance between the processing load 208 and the request rate 210 and determine the correlation value 212 using the variance value. In embodiments, the correlation value 212 can include, but not limited to, the Pearson's correlation coefficient, the sample correlation coefficient, or the population correlation coefficient. The correlation value 212 is described in greater detail below with respect to (310) of method 300 of FIG. 3.

The device can determine a range of time 214. The range of time 214 can include or correspond to a time range, time window or window period. The range of time 214 can include to be selected to represent a time range to monitor a server 260 (e.g., previous time range, future time range). The range of time 214 can include, but not limited to, a day, multiple days, a few weeks or a few months. The device 202 can select the range of time 214 based in part on properties of the server 260 to be monitored and/or a time value (e.g., length of monitoring). The rolling window 216 (e.g., rolling time window) can include or correspond to a continuous monitoring period or a period of monitoring having no set end time. The rolling window 216 can include, but not limited to, one or more range of time 214 or monitoring in an ongoing manner. In embodiments, the device 202 can determine or set a rolling window 216 to determine the correlation value 212 for a server 260 on a fixed contiguous block of prior observations and using it as a forecast to monitor future ranges of time 214 for a server 260. The rolling window 216 can include or apply a moving average values and weighted values to correlation values 212 for a server 260 such that more recent or newer correlation values 212 have a different weight (e.g., greater, lower) than weights assigned to older correlation values 212 for a server 260.

The device 202 can determine or select a threshold 218 for the correlation value 212 of a server 260. In embodiments, a threshold 218 can be unique or determined for a particular server 260. The threshold 218 can include or correspond to an outlier detection threshold to detect a correlation value 212 that is greater than an acceptable correlation value, outside an acceptable range and/or varies from one or more previous correlation values 212 outside an acceptable range. The threshold 218 can include one or more previous correlation value 212 for a server 260. For example, the device 202 can use the threshold 218 to determine if a current or most recent correlation value 212 is different from one or more previous correlation values 212 for a server 260. In some embodiments, the device 202 can determine the threshold 2118 based in part on an interquartile range of one or more correlation values 212 for a server 260. The interquartile range can include or correspond to a measure of variability between the correlation values 212 based on dividing a data set of correlation values 212 into quartiles. The interquartile range can vary and be selected based at least in part on the server 260 being monitored and/or a number of correlation values 212 (e.g., previous correlation values 212) determined for the server 260. In embodiments, if the device 202 determines that a new or most recent correlation value 212 is beyond, outside of or not within the threshold 218, the device 202 can determine a change in the correlation value 212 for the server 260 occurred and/or a detect a performance change for the server 260. The threshold 218 can include a number, a range of numbers, a percentage, a range of percentages, a value, and/or a range of values.

The device 202 can generate an alert 220. The alert 220 can include or correspond to a notification. The alert 220 can include a notification indicating one or more of: a change in a correlation value 212, an overload condition for a server 260, a degradation in performance 222 of the server 260, a cause for the change in the performance 222 of the server 260 (e.g., increase in the processing load 208, increase in a request rate 210), identification of one or more services 262 (e.g., new services 262) causing the change in the performance 222 of the server 260, and/or a time of day of the event. The device 202 can generate an alert to identify a resource, session, application and/or service 262 executing on the server 260 and causing the change in the performance 222 of the server 260. In some embodiments, the device 202 can provide the alert 220 through a window or menu of a user interface of the device 202 or one or more client devices 250 to notify a user of the device 202 or one or more client devices 250 of the change in the performance 222 of the server 260.

The device 202 can determine a performance 222 or change in performance 222 for a server 260. The performance 222 of a server 260 can be based in part on a resource utilization of one or more services 262 of a server 260, a memory allocation between one or more services 262 of a server 260, a number of services 262 active on a server 260, a processing load 208, a request rate 210 and/or a response time of a server 260. The change in the performance 222 of the server 260 can include, but not limited to, a degradation in the performance 222 of the server 260, an overload condition (e.g., high CPU utilization, high request rate), and/or a reduced response time of one or more services 262 of a server 260.

The device 202 can apply a filter 224 to the processing load 208 of a server 260 and to the request rate 210 of a server 260. The device 202 can apply the filter 224 to the processing load 208 and to the request rate 210 to generate a first signal indicative of a plurality of conditioned values 226 for the processing load 208 for a range of time 214 and second signal indicative of a plurality of conditioned values 226 for the request rate 210 for the range of time 214. The filter 224 can include, but not limited to, a moving average filter or exponentially weighted moving average (EWMA) algorithm. The device 202 can apply the filter 224 to the processing load 208 to generate a moving average for the processing load 208. The moving average of the processing load 208 can include or correspond to a plurality of conditioned values 226 indicative of a first signal or processing load signal 208. The device 202 can apply the filter 224 to the request rate 210 to generate a moving average for the request rate 210. The moving average of the request rate 210 can include or correspond to a plurality of conditioned values 226 indicative of a second signal or request rate signal 210. The device 202 can apply the filter 224 to condition or smooth the values forming the processing load 208 and the request rate 210, for example, to remove variations (e.g., high frequency) in the respective signals that may cause computation errors or inaccurate metrics. The filter 224 can generate more consistent values and filter out and remove random spikes in values that can lead to an inaccurate correlation value 212.

The device 202 can determine a confidence value 228 for a correlation value 212. In embodiments, the device 202 can determine or assign a confidence value 228 for each correlation value 212. The confidence value 228 can include or correspond to a confidence interval for the respective correlation value 212 indicating a confidence (e.g., likelihood) that the determined correlation value 212 is within a confidence range 230 of correlation values 212. The confidence range 230 can include an estimated range of correlation values 212 that a particular correlation value 212 is between or falls within. The device 202 can determine or assign a confidence value 228 indicating if the current or most recent correlation value 212 is within a confidence range 230. The confidence range 230 can include one or more previous correlation values 212 for the server 260 or one or more confidence values 228 for one or more previous correlation values 212 determined for the server 260. For example, the device 202 can compare the confidence value 228 to a confidence range 230 including one or more previous correlation values 212 for the server 260. If the device 202 detects or determines that the confidence value 228 is outside the confidence range 230 (e.g., the confidence interval of a current correlation value 212 does not intersect with the confidence interval of the one or more previous correlation values 212), the device 202 can determine a change in the correlation value 212 for the server 260 and/or a change in a performance 222 of the server 260.

Server 260 can include or deployed as, and/or be executed on any type and form of computing device, such as any desktop computer, laptop computer, or mobile device capable of communication over at least one network and performing the operations described herein. For example, servers 260 can include or correspond to one computer, a plurality of computers, or a network of distributed computers such as computer 100 shown in FIG. 1A. In embodiments, servers 260 can include or execute one or more services 262. The services 262 can include applications, resources, configured to perform one or more tasks for a server 260 and/or a client device 250. In some embodiments, the services 262 can include software, hardware or a combination of software and hardware to perform automated tasks, responds to hardware events, or respond to request for data from one or more processors 204 of the server 260. The services 262 can include or be made up of multiple microservices. The services 262 can include any of the services described herein with respect to FIG. 1B (e.g., Software as a Service (SaaS) 180, Platform as a Service (PaaS) 185, and Infrastructure as a Service (IaaS) 190).

In embodiments, servers 260 can execute one or more applications on behalf of one or more of client devices 250 (e.g., as an application server), although other uses are possible, such as a file server, gateway server, proxy server, or other similar server uses. Client devices 250 may seek access or to establish a session 254 to a hosted application on a server 260 or access the functionality of a service 262. For example, a client device 250 can generate a request 252 to establish a session 254 to at least one server 260 for an application or resource provided by the server 260. The request 252 can identify or indicate a service 262, an application, resource and/or client device 250 transmitting the request 252.

The client device 250 can include, but not limited to a computing device or a mobile device. The client device 250 can include or correspond to an instance of any client device, mobile device or computer device described herein. For example, the client device 250 can be the same as or substantially similar to computer 100 of FIG. 1A. The client device 250 can couple with the device 202 to establish one or more sessions 254 to one or more servers 260. In embodiments, the client device 250 can execute or run a client application, for example, provided by device 202 to provide access to a server 260 or to enable access to an application or resource provided by a server 260. For example, the client application can execute or run within a browser (e.g., embedded browser) of the client device 250.

The sessions 254 can include a channel, connection or session between a client device 250 and the device 202, between the device 202 and a server 260 and/or between a client device 250 and a server 260. The sessions 254 can correspond to or be used to establish an application session (e.g., virtual application), an execution session, a desktop session, a hosted desktop session, a terminal services session, a browser session, a remote desktop session, a URL session and/or a remote application session. The session 254 may include encrypted and/or secure sessions established between the device 202 and a client device 250. For example, a session 254 may include an encrypted session and/or a secure session established between the device 202 and a client device 250. The encrypted session 254 can include an encrypted file, encrypted data or traffic transmitted between the device 202 and a client device 250.

The above-mentioned elements or entities may be implemented in hardware, or a combination of hardware and software, in one or more embodiments. Components of the device 202 may be implemented using hardware or a combination of hardware or software detailed above in connection with FIGS. 1A-1B. For instance, these elements or entities can include any application, program, library, script, task, service, process or any type and form of executable instructions executing on hardware of a device (e.g., device 202). The hardware includes circuitry such as one or more processors in one or more embodiments.

Figure 2B:
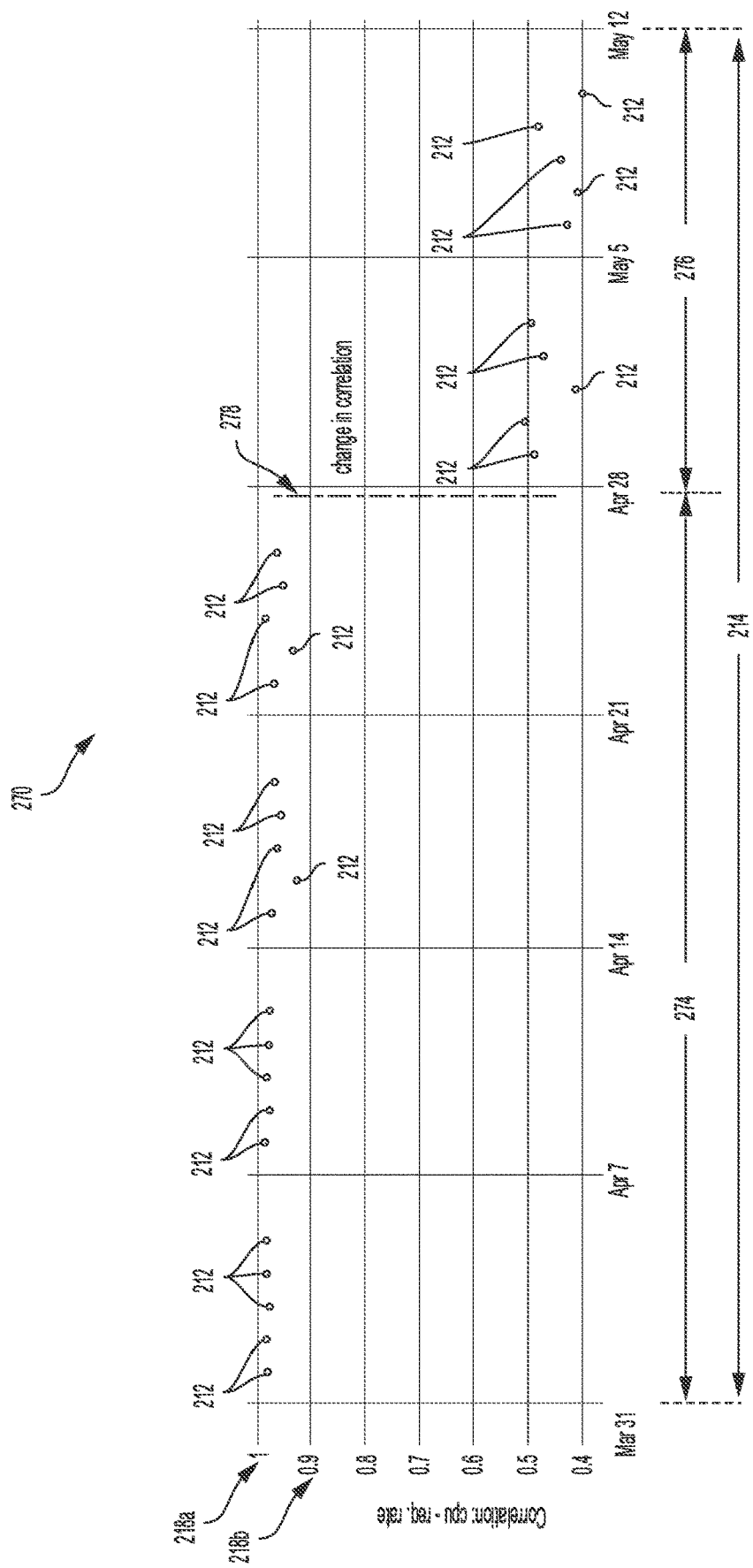
FIG. 2B is a graph of a plurality of correlation values for a server for a range of time.

Referring now to FIG. 2B, depicted is a graph 270 of a plurality of correlation values 212 for a server 260 for a range of time 214. The graph 270 can include a plurality of correlation values 212 for a server 260 and provided in a time series over a range of time 214 (e.g., monitoring period). The correlation value 212 can include a correlation between a processing load 208 of a server 260 and a request rate 210 of a server 260. The correlation values 212 can be determined for the server 260 at each time interval (e.g., single day intervals 272) during the range of time 214. The device 202 can determine the correlation value 212 at each time interval of the range of time 214 for the server 260 to monitor the processing load 208 of the server, request rate 210 for the server 260 and a performance of the server 260. The device 202 determine or set a threshold 218 for the server 260 (e.g., between 0.9 and 1 for a correlation value), here a threshold range 218 having a first threshold point 218a (e.g., 1) and a second threshold point 218b (e.g., 0.9). The threshold 218 can include or correspond to one or more previous correlation values 212 for the server 260.

As illustrated in graph 270, during a first portion 274 of the range of time 214, the correlation values 212 within the range of the threshold 218. For example, the correlation values 212 for the first portion fall between the first threshold point 218a and the second threshold point 218b. However, at a time point 278, a change in correlation value 212 occurs and indicated by the line 276. For example, the determined correlation values 212 for the server 260 after the line 276 drop or fall outside the threshold range 218, here less than first threshold point 218a. The device 202 can compare the correlation values 212 after the line 278 to the threshold 218 and determine that the correlation values 212 are outside the range of the threshold 218 for a second portion 276 of the range of time 214. The device 202 can determine a change in correlation for the server 260 and determine a change in a performance of the server 260 responsive to the change in the correlation value 212 of the server 260.

The change in correlation value 212 can occur, for example, due to a new service being activated or executing on the server 260 and using server resources (e.g., processing load 208, CPU utilization), a new service 262 being bound to memory of a server 260, or an increase in resource utilization by one or more existing services 262 of the server 260. The change in correlation value 212 can occur due to an increase in a level of traffic or increase in a request rate 210 for an existing service 262 or new service 262 of the server 260. The device 202 can generate an alert 220 indicating a change in a performance 222 of the server responsive to a comparison of the value 212 to the threshold 218 for the server 260. The device 202 can generate the alert 220 indicating a degradation in a performance 222 of the server 260 responsive to the correlation value 212 being outside a range of the threshold 218 for the server 260.

Figure 3:
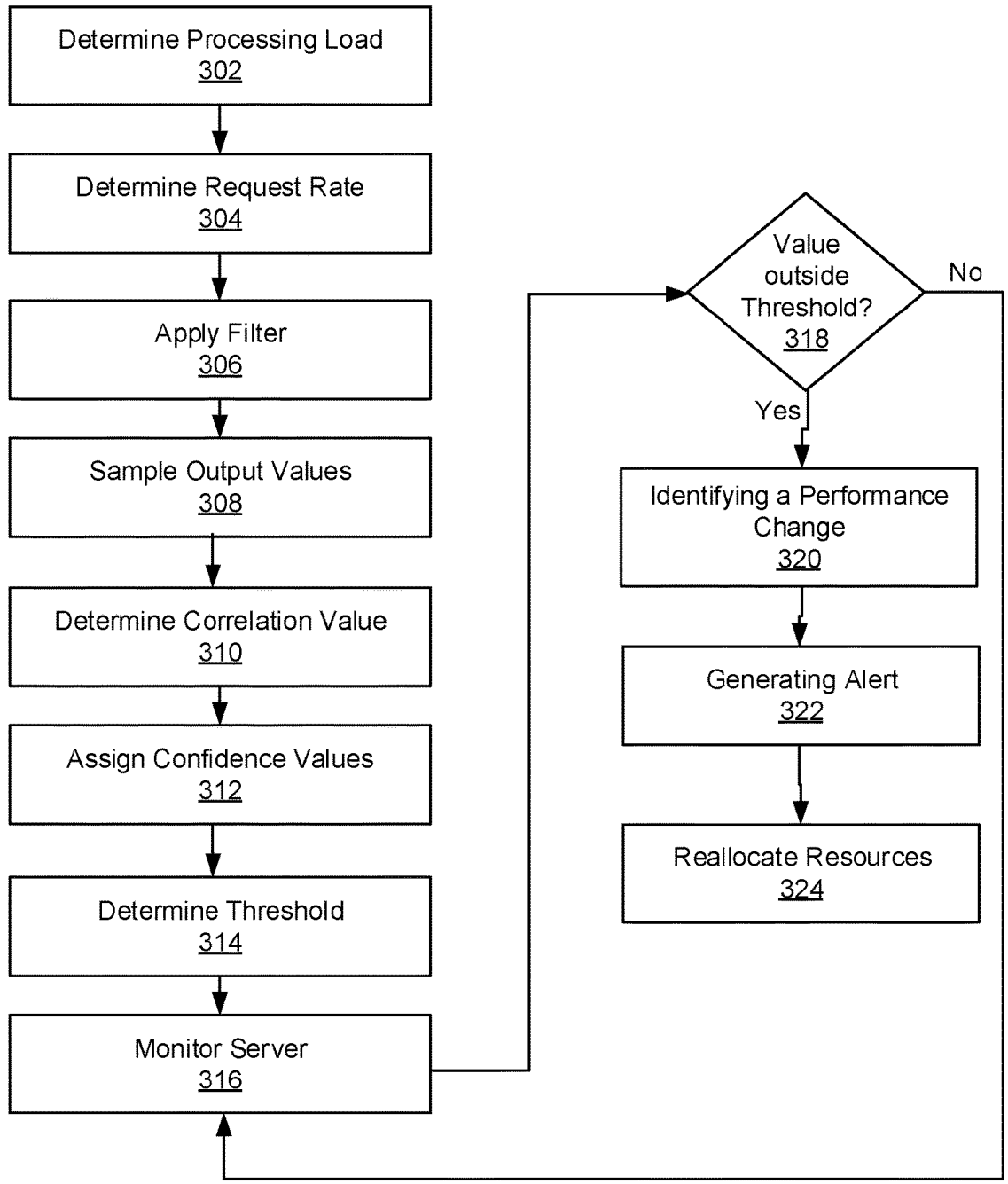
FIG. 3 is a flow diagram of a method for determining a change in a performance of a server.

Referring now to FIG. 3, depicted is a flow diagram of one embodiment of a method 300 for determining a change in a performance of a server. In brief overview, the method 300 can include one or more of: determining a processing load (302), determining a request rate (304), applying a filter (306), sampling output values (308), determining a correlation value (310), assigning confidence values (312), determining a threshold (314), monitoring a server (316), determining if a value is outside a threshold range (318), identifying a performance change (320), generating an alert (322), and reallocating resources (324). The functionalities of the method 300 may be implemented using, or performed by, the components detailed herein in connection with FIGS. 1A-2A.

Referring now to operation (302), and in some embodiments, a processing load can be determined. A device 202 can receive, detect or determine a processing load 208 of a server 260. The processing load 208 can include, but not limited to, a CPU utilization value, a resource utilization value, a device usage value, memory, service load value or a load on one or more processors. The device 202 can monitor the processing load 208 for a plurality of servers 260 in a computing environment 200. The device 202 can monitor the resource utilization by one or more services 262 executing on a respective server 260. For example, the servers 260 can provide, host or include one or more services 262. The services 262 when active and executing on a server 260 can utilize server resources increasing the processing load 208 of the respective server 260. In embodiments, the device 202 can receive a signal representing or corresponding to the processing load 208 for a server 260. For example, the device 202 can receive a processing load signal 208 from a server 260 in response to a request to the server 260 for the processing load 208.

Referring now to operation (304), and in some embodiments, a request rate can be determined. The device 202 can receive, detect or determine a request rate 210 for a server 260. The request rate 210 can include or correspond to a level of incoming traffic and/or a number of requests to one or more services 262 of a server 260. For example, the requests can include requests from one or more client devices 250 to access a service 262 of a server 260. The request rate 210 can include or correspond to a total request rate for a server 260. The request rate 210 can include or correspond to a request rate 210 of an individual service 262. For example, the request rate 210 can include a total number of requests to a particular service 262 or the request rate of each service 262 running on the server 260 individually. In embodiments, the device 202 can receive a signal representing or corresponding to the request rate 210 for a server 260 and/or for a service 262 of a server 260. For example, the device 202 can receive a request rate signal 210 from a server 260 in response to a request to the server 260 for the request rate 210 for the server 260 and/or for a service 262 of a server 260.

Referring now to operation (306), and in some embodiments, a filter can be applied. The device 202 can apply a filter 224 to the processing load 208 and to the request rate 210 to generate a first signal indicative of a plurality of conditioned values 226 for the processing load 208 for a range of time 214 and second signal indicative of a plurality of conditioned values 226 for the request rate 210 for the range of time 214. The device 202 can apply the filter 224 to condition or smooth the values forming the processing load 208 and the request rate 210, for example, to remove variations (e.g., high frequency) in the respective signals that may cause computation errors or inaccurate metrics.

The filter 224 can generate more consistent values and filter out and remove random spikes in values that can lead to an inaccurate correlation value 212. The filter 224 can include, but not limited to, a moving average filter or exponentially weighted moving average (EWMA) algorithm.

The device 202 can apply the filter 224 to the processing load 208 to generate a moving average for the processing load 208. The moving average of the processing load 208 can include or correspond to a plurality of conditioned values 226 indicative of a first signal or processing load signal 208. In embodiments, the device 202 can apply the filter 224 to the request rate 210 to generate a moving average for the request rate 210. The moving average of the request rate 210 can include or correspond to a plurality of conditioned values 226 indicative of a second signal or request rate signal 210. The filter 224 can include a determined time interval or width (e.g., 5 minutes intervals, 1 hour intervals) over a selected range of time 214 (e.g., 1 day, one week). The moving average can include or correspond to an average or mean of a set of values for the processing load 208 and/or request rate 210 over a defined range of time 214 or time period. For example, the moving average can include a mean of the processing load 208 and/or request rate 210 for a first range of time 214 at a determined time interval (e.g., 5 minute intervals, 1 hour intervals).

The range of time 214 can include a time period or time interval corresponding to a current session 254 of a server 260 and/or one or more previous sessions 254 of a server 260 to calculate the correlation value 212. The range of time 214 can vary and be selected based in part on the server 260 and/or an amount of data (e.g., one week worth of data, one month worth of data, a few days' worth of data) to be used to determine the correlation value 212. The device 202 can select an initial or previous range of time 214 corresponding to previous processing load 208 values and/or request rate 210 values for a server 260 to generate an initial correlation value 212. For example, the device 202 can retrieve past or most recent processing load 208 values and/or request rate 210 values for a server 260 to determine a first correlation value 212. The device 202 can select a current range of time 214 corresponding to a current time period and current processing load 208 values and/or request rate 210 values for a server 260 to generate a current correlation value 212.

Referring now to operation (308), and in some embodiments, output values can be sampled. The device 202 can sample output values from the filter 224 (e.g., first signal, second signal, conditioned values 226) to reduce or avoid autocorrelation between the processing load 208 and the request rate 210. For example, the device 202 can subsample the conditioned values 226 of the processing load signal 208 (e.g., first signal) using a determined time interval to determine at least one sample per the defined time interval. In one embodiment, the device 202 can sample or subsample the conditioned values 226 of the processing load signal 208 (e.g., first signal) to determine one sample per hour for a defined time interval corresponding to one hour intervals. The device 202 can subsample the conditioned values 226 of the request rate signal 210 (e.g., second signal) using a determined time interval to determine at least one sample per the defined time interval. In one embodiment, the device 202 can sample or subsample the he conditioned values 226 of the request rate signal 210 (e.g., second signal) to determine one sample per hour for a defined time interval corresponding to one hour intervals.

Referring now to operation (310), and in some embodiments, a correlation value can be determined. The device 202 can determine a correlation value 212 between the processing load 208 of the server 260 and the request rate 210 for a range of time 214. In embodiments, the device 202 can use the conditioned values 226 for the processing load 208 and the conditioned values 226 for the request rate 210 to determine the correlation value 212. The device 202 can use the mean or moving average (e.g., conditioned values 226) of the processing load 208 and the request rate 210 to determine the correlation value 212. For example, the device 202 can determine the correlation value 212 between the conditioned values 226 for the processing load 208 and the conditioned values 226 for the request rate 210.

The correlation value 212 (e.g., correlation coefficient) can include or represent a numerical measure of a statistical relationship (e.g., correlation) between two variables, here between the processing load 208 and the request rate 210. The correlation value 212 (e.g., correlation coefficient) can include or represent a metric indicating a strength and direction of a linear relationship between the processing load 208 and the request rate 210. In some embodiments, the device 202 can determine a variance between the processing load 208 and the request rate 210 and determine the correlation value 212 using the variance value. In embodiments, the correlation value 212 can include, but not limited to, the Pearson's correlation coefficient, the sample correlation coefficient, or the population correlation coefficient.

The correlation value 212 between the processing load 208 and the request rate 210 can be determined for the range of time 214 or for a rolling window 216 (e.g., continuously determine, ongoing manner). The device 202 can determine the correlation value 212 between the processing load 208 and the request rate 210 for the rolling window 216 having a determined time interval (e.g., width, step size) and in an ongoing manner. The time interval can be selected to provide enough variability between the processing load 208 and the request rate 210. For example, the determined time interval "T" of the rolling window 216 can include, but not limited to, a one day, a few days or a few weeks' worth of data. The device 202 can determine the correlation value 212 for the determined time interval (e.g., each hour of a day, (i=1, . . . , 24)) for the rolling window 216. The time interval of the rolling window 216 can vary (e.g., less than one day, greater than one day) based at least in part on the server 260 to be monitored and/or a number of services 262 of the server 260.

The device 202 can continuously determine the correlation value 212 for a rolling window 216 that includes one or more ranges of time 214. For example, the device 202 can continuously determine the processing load 208 over one or more ranges of time 214 and the processing load 208 can be indicative of a central processing unit (CPU) utilization of the server 260. The device 202 can continuously determine the request rate 210 for the server 260 over one or more ranges of time 214. The device 202 can continuously determine a total number of requests to the server 260 over one or more ranges of time 214 and/or continuously determine a total number of requests to one or more services 262 of the server 260 over one or more ranges of time 214. In embodiments, the device 202 can continually determine the correlation value 212 to provide ongoing or active monitoring of a server 260 for the rolling window 216. The device 202 can continuously determine the correlation value 212 to detect variations or fluctuations in the processing load 208, request rate 210 and/or performance 222 of a server 260. In some embodiments, the range of time 214 or the rolling window 216 can include a current time point and/or one or more future time points. For example, the device 202 can determine the correlation value 212 using a current processing load values 208 and current request rate values 210 of a current time point to continually determine the correlation value 212 such that the correlation value 212 corresponds to or reflects a current level of the processing load 208 and the request rate 210.

Referring now to operation (312), and in some embodiments, confidence values can be assigned. The device 202 can assign confidence values 228 to the correlation values 212. In embodiments, the correlation values 212 can include an associated confidence value 228 (e.g., confidence interval) and/or be assigned a confidence value 228. The confidence value 228 can include or correspond to a confidence interval for the respective correlation value indicating a confidence that the determined correlation value 212 is within a confidence range 230 of correlation values 212. The confidence range 230 can include an estimated range of correlation values 212 that a particular correlation value 212 is between or falls within. The device 202 can determine or assign a confidence value 228 indicating if the current or most recent correlation value 212 is within a confidence range 230. In some embodiments, the confidence range 230 can include one or more previous correlation values 212 for the server 260 or one or more confidence values 228 for one or more previous correlation values 212 determined for the server 260. For example, the device 202 can compare the confidence value 228 to a confidence range 230 including one or more previous correlation values 212 for the server 260. If the device 202 detects or determines that the confidence value 228 is outside the confidence range 230 (e.g., the confidence interval of a current correlation value 212 does not intersect with the confidence interval of the one or more previous correlation values 212), the device 202 can determine a change in the correlation value 212 for the server 260 and/or a change in a performance 222 of the server 260.

Referring now to operation (314), and in some embodiments, a threshold can be determined. The device 202 can determine or select a threshold 218 that is indicative of one or more previous correlation values 212 determined for a server 260 for a range of time 214 or rolling window 216. The threshold 218 can include or correspond to an outlier detection threshold to detect a correlation value 212 that is outside an acceptable range or varies from one or more previous correlation values 212 outside an acceptable range. In some embodiments, the device 202 can determine the threshold 218 based in part on an interquartile range of one or more correlation values 212 for a server 260. The interquartile range can include or correspond to a measure of variability between the correlation values 212 based on dividing a data set of correlation values 212 into quartiles. The interquartile range can vary and be selected based at least in part on the server 260 being monitored and/or a number of correlation values 212 (e.g., previous correlation values 212) determined for the server 260. In embodiments, if the device 202 determines that a new or most recent correlation value 212 is beyond, outside of or not within the threshold 218, the device 202 can determine a change in the correlation value 212 for the server 260 occurred and/or a detect a performance change for the server 260.

The device 202 can use the threshold 218 to monitor and/or assess the correlation value 212 for a server 260 in a rolling window 216 or ongoing manner. The threshold 218 can vary and can be selected based in part on a time period (e.g., time of day, time of year), a number of correlation values 212 (e.g., previous correlation values 212) determined for the server 260 and/or the server 260 to be monitored. In embodiments, two or more servers 260 can have different thresholds 218. The threshold 218 for a server 260 can be selected to be a range of correlation values 212. The device 202 can modify or tune the threshold 218 based in part on a change in one or more previous correlation values 212 for a server 260. For example, the device 202 can detect a trend or change in an average correlation value 212 for a server 260 and modify the threshold 218 such that the threshold 218 includes the an average correlation value 212 for a server 260 and/or that the an average correlation value 212 for a server 260 falls at a midpoint or mid-value of the range of correlation values 212 forming the threshold 218.

Referring now to operation (316), and in some embodiments, a server can be monitored. The device 202 can select at least one server 260 and monitor the server 260 by determining the correlation value 212 for the server, for example, continuously for a range of time 214 or rolling window 216 and compare the correlation value to a threshold 218. The device 202 can compare the correlation value 212 at determined time intervals to the threshold 218 to determine if a current correlation value 212 is outside the threshold 218 or within the threshold 218. For example, the device 202 can determine a correlation value 212 at each time interval (e.g., each hour, every 30 minutes) for a range of time 214 and/or rolling window 216. The device 202 can compare a current or most recent determined correlation value 212 to the threshold 218 at each time interval to detect whether the a current correlation value 212 is outside the threshold 218 or within the threshold 218. The device 202 can continuously compare correlation values 212 to the threshold 218 during the range of time 214 and/or rolling window 216 to monitor the respective server 260 or a plurality of servers 260 in a computing environment 200 and to detect an overload condition and/or performance issues of a server 260.

Referring now to operation (318), and in some embodiments, a determination can be made if the correlation value is within a threshold, less than a threshold or greater than a threshold. The device 202 can determine whether the correlation value 212 for a server 260 is within a threshold 218, less than a threshold 218 or greater than a threshold 218 during a range of time 214 and/or a rolling window 216. For example, the device 202 can determine if the correlation value 212 is within a threshold 218, less than a threshold 218 or greater than a threshold 218 at one or more points in a range of time 214 or rolling window 216. In embodiments, if the correlation value 212 is within the threshold 218, the method 300 can return to (316) to continue monitoring the respective server 260 at the one or more subsequent or future time points or time intervals of the range of time 214 or rolling window 216. In embodiments, if the correlation value 212 is outside the threshold 218, the method 300 can go to (320) to determine if a performance change has occurred and/or a reason for the change in the correlation value 212 for the respective server 260.

Referring now to operation (320), and in some embodiments, a performance change can be identified. The device 202 can determine whether the correlation value 212 is greater than a threshold 218 for the server 260 or outside a threshold for the server 260. The device 202 can determine a degradation in a performance 222 of the server 260 responsive to the correlation value 212 being greater than the threshold 218 or outside the threshold 218 (e.g., threshold range). For example, the device 202 can detect a change in the value 212 (e.g., correlation value) for the server 260 responsive to the value 212 being greater than the threshold 218 for the server 260; and or outside the threshold 218 (e.g., threshold range). The device can identify a degradation in a performance 222 of the server 260 responsive to the change in the value 212 for the server 260.

In some embodiments, the device 202 can detect that the confidence value 228 for a correlation value 212 is outside a confidence range 230. The confidence range 230 can include a plurality of confidences 228 for one or more previous correlation values 212 determined for the server 260. The device 202 can determine a change in the correlation value 212 for the server 260 responsive to the confidence 228 being outside the confidence range 230. The device 202 can detect a degradation in a performance 222 of the server 260 responsive to the change in the correlation value 212 for the server 260. The change in performance 222 of the server 260 can include, but not limited to, a degradation in the performance 222 of the server 260, an overload condition (e.g., high CPU utilization, high request rate) The device 202 can determine if the change in the correlation value 212 resulted in a degradation or change in performance 222 of the server 260 In embodiments, the change in correlation value 212 can indicate an overload condition that can cause or result in an imbalance, performance issues and/or reduced response times for sessions 254 to the respective server 260.

The degradation or change in performance 222 of the server 260 can include a reduced response time and/or failure of one or more sessions 254 between at client device 250 and a service 262 of the server 260. In embodiments, the device 202 can determine the response times of the server 260 and/or one or more services 262 of the server 260 to one or more requests or interactions with one or more client devices 250 during one or more sessions 254. The device 202 can determine if the response times of one or more services 262 of the server 260 have been reduced at the time point or over the range of time 214 or rolling window 216.

Referring now to operation (322), and in some embodiments, an alert can be generated. The device 202 can generate an alert 220 indicating a change in a performance 222 of the server responsive to a comparison of the value 212 to the threshold 218 for the server 260. The device 202 can generate the alert 220 indicating a degradation in a performance 222 of the server 260 responsive to the value being greater than the threshold 218 for the server 260 or outside the threshold 218 for the server 260.

The device 202 can compare the correlation value 212 to the threshold 218 and generate alerts 220 if the correlation value 212 is greater than the threshold 218 for the server 260 or outside the threshold 218 for the server 260 during one or more points in a range of time 214 or rolling window 216 (e.g., monitoring time period). In embodiments, the device 202 can provide an automated tool to generate alerts 220 or notifications when the correlation value 212 of a server 260 changes, for example, in response to an increase in the processing load 208 of the server 260 and/or an increase in a request rate 210 of the server 260.

The alert 220 can include a notification indicating one or more of: a change in a correlation value 212, an overload condition for a server 260, a degradation in performance 222 of the server 260, a cause for the change in the performance 222 of the server 260 (e.g., increase in the processing load 208, increase in a request rate 210), identification of one or more services 262 (e.g., new services 262) causing the change in the performance 222 of the server 260, and/or a time of day of the event. The device 202 can generate an alert to identify a resource, session 254, application and/or service 262 executing on the server 260 and causing the change in the performance 222 of the server 260. In some embodiments, the device 202 can provide the alert 220 through a window or menu of a user interface of the device 202 or one or more client devices 250 to notify a user of the device 202 or one or more client devices 250 of the change in the performance 222 of the server 260.

Referring now to operation (324), and in some embodiments, a determination to reallocate resource can be made. The device 202 can determine to reallocate resources, for example, in a computing environment 200, in response to a change in a correlation value 212 of a server 260. The device 202 can determine that one or more services 262 of a server 260 are causing an overload condition, using a larger percentage of server resources (e.g., CPU utilization), have a high request rate 210 and/or are experiencing a degradation in performance. The device 202 can manage the resource allocation among a plurality of servers 260 using the correlation values 212, processing loads 208, request rates 210 and thresholds 218 of the respective servers 260. The device 202 can generate instructions to forward future requests for one or more services 262 from a client device 250 to a server 260 to servers 260 having a correlation value 212 less than the respective threshold 218 or within the respective threshold 218 of the server 260 the services 262 are executing on. The device 202 can generate instructions to deny or prevent requests for one or more services 262 from a client device 250 to a server 260 to servers 260 having a correlation value 212 greater than the respective threshold 218 or outside the respective threshold 218 of the server 260 the services 262 are executing on. In some embodiments, the device 202 can provide instructions to one or more servers 260 to not activate new services 262 until the correlation value 212 less than the respective threshold 218 or within the respective threshold 218 of the server 260 the services 262 are executing on. In embodiments, the device can end or de-activate one or more services 262 to reduce a processing load 208 of a server 260 and/or reduce a request rate 210 of a server 260. The device 202 can continue to monitor the correlation value 212 for one or more servers 260 and manage the resource allocation among the plurality of servers 260 using the correlation values 212 and threshold 218 of the respective servers 260.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It will be further understood that various changes in the details, materials, and arrangements of the parts that have been described and illustrated herein may be made by those skilled in the art without departing from the scope of the following claims.

We claim:

1. A method comprising:
receiving, by a device, a processing load of a server and a request rate indicative of a number of requests to the server;
applying, by the device, a filter to the processing load and to the request rate to generate a first signal for the processing load for a range of time and a second signal for the request rate for the range of time;
determining, by the device based on the first signal and the second signal, a value indicative of a correlation between the processing load of the server and the request rate for the range of time;

assigning, by the device, a confidence for the value indicative of the correlation between the processing load and the request rate of the server for the range of time;

detecting, by the device, that the confidence is outside a confidence range, the confidence range including a plurality of confidences for one or more previous values determined for the server;

determining, by the device, a change in the value responsive to the confidence being outside the confidence range and the value outside a range of a threshold for the server, the threshold indicative of one or more previous values determined for the server for the range of time indicative of previous correlations between previous processing loads and previous request rates;

detecting, by the device, a degradation in a performance of the server responsive to the change in the value for the server; and generating, by the device responsive to the detection of the degradation in the performance of the server, an alert indicating the degradation in the performance of the server.

2. The method of claim 1, comprising:
detecting, by the device, the change in the value for the server responsive to the value being less than the range of the threshold for the server.

3. The method of claim 1, comprising:
generating, by the device, the alert indicating the degradation in the performance of the server responsive to the value being less than the range of the threshold for the server.

4. The method of claim 1, comprising:
continuously determining, by the device, the processing load over one or more ranges of time, the processing load indicative of a central processing unit (CPU) utilization of the server.

5. The method of claim 1, wherein the request rate is indicative of a total number of requests to the server, and
continuously determining, by the device, the total number of requests to the server for a plurality of ranges of time.

6. The method of claim 1, wherein the request rate is indicative of the number of requests to a service of the server, and
continuously determining, by the device, the number of requests for the service for a plurality of ranges of time.

7. A system comprising:
one or more processors coupled to memory, the one or more processors configured to:
receive a processing load of a server and a request rate indicative of a number of requests to the server;
apply a filter to the processing load and to the request rate to generate a first signal indicative for the processing load for a range of time and a second signal for the request rate for the range of time;
determine, based on the first signal and the second signal, a value indicative of a correlation between the processing load of the server and the request rate for the range of time;
assign a confidence for the value indicative of the correlation between the processing load and the request rate of the server for the range of time;

detect that the confidence is outside a confidence range, the confidence range including a plurality of confidences for one or more previous values determined for the server;
determine a change in the value responsive to the confidence being outside the confidence range and that the value is outside a range of a threshold for the server, the threshold indicative of one or more previous values determined for the server for the range of time indicative of previous correlations between previous processing loads and previous request rates;
detect a degradation in a performance of the server responsive to the change in the value for the server and the value being outside the range of the threshold; and
generate, responsive to the detection of the degradation in the performance of the server, an alert indicating the degradation in the performance of the server.

8. The system of claim 7, wherein the one or more processors are configured to:
detect the change in the value for the server responsive to the value being less than the range of the threshold for the server.

9. The system of claim 7, wherein the one or more processors are configured to:
generate the alert indicating the degradation in the performance of the server responsive to the value being less than the range of the threshold for the server.

10. The system of claim 7, wherein the one or more processors are configured to:
continuously determine the processing load over one or more ranges of time, the processing load indicative of a central processing unit (CPU) utilization of the server.

11. The system of claim 7, wherein the one or more processors are configured to:
continuously determine a total number of requests to the server for a plurality of ranges of time.

12. The system of claim 7, wherein the one or more processors are configured to:
continuously determine the number of requests for a service of the server for a plurality of ranges of time.

13. A non-transitory computer-readable medium, comprising instructions that, when executed by a processor of a device, cause the processor to:
receive a processing load of a server and a request rate indicative of a number of requests to the server;
apply a filter to the processing load and to the request rate to generate a first signal for the processing load for a range of time and a second signal for the request rate for the range of time;
determine, based on the first signal and the second signal, a value indicative of a correlation between the processing load of the server and the request rate for the range of time;
assign a confidence for the value indicative of the correlation between the processing load and the request rate of the server for the range of time;
detect that the confidence is outside a confidence range, the confidence range including a plurality of confidences for one or more previous values determined for the server;
determine a change in the value responsive to the confidence being outside the confidence range and that the value is outside a range of a threshold for the server, the threshold indicative of one or more previous values determined for the server for the range of time indicative of previous correlations between previous processing loads and previous request rates;
detect a degradation in a performance of the server responsive to the change in the value for the server and the value being outside the range of the threshold; and
generate, responsive to the detection of the degradation in the performance of the server, an alert indicating the degradation in the performance of the server.

14. The computer-readable medium of claim 13, further comprising instructions that cause the processor to:
detect the change in the value for the server responsive to the value being less than the range of the threshold for the server.

* * * * *